US011948312B2

United States Patent
Oami

(10) Patent No.: US 11,948,312 B2
(45) Date of Patent: Apr. 2, 2024

(54) OBJECT DETECTION/TRACKING DEVICE, METHOD, AND PROGRAM RECORDING MEDIUM

(71) Applicant: NEC Corporation, Tokyo (JP)

(72) Inventor: Ryoma Oami, Tokyo (JP)

(73) Assignee: NEC CORPORATION, Tokyo (JP)

(*) Notice: Subject to any disclaimer, the term of this patent is extended or adjusted under 35 U.S.C. 154(b) by 77 days.

(21) Appl. No.: 17/600,699

(22) PCT Filed: Apr. 17, 2019

(86) PCT No.: PCT/JP2019/016513
§ 371 (c)(1),
(2) Date: Oct. 1, 2021

(87) PCT Pub. No.: WO2020/213099
PCT Pub. Date: Oct. 22, 2020

(65) Prior Publication Data
US 2022/0180536 A1    Jun. 9, 2022

(51) Int. Cl.
*G06T 7/246*    (2017.01)
*G06T 7/70*    (2017.01)
*G06V 20/40*    (2022.01)

(52) U.S. Cl.
CPC ............. *G06T 7/251* (2017.01); *G06T 7/70* (2017.01); *G06V 20/41* (2022.01); *G06T 2207/10016* (2013.01)

(58) Field of Classification Search
CPC . G06T 7/251; G06T 7/70; G06T 2207/10016; G06T 2207/20021;
(Continued)

(56) References Cited

U.S. PATENT DOCUMENTS

| | | | | |
|---|---|---|---|---|
| 8,615,105 B1* | 12/2013 | Cheng | ............... | G06V 20/52 |
| | | | | 382/103 |
| 2011/0150284 A1* | 6/2011 | Son | ............ | G06T 7/215 |
| | | | | 382/103 |

(Continued)

FOREIGN PATENT DOCUMENTS

| | | | | |
|---|---|---|---|---|
| JP | 2010-072723 A | 4/2010 | | |
| JP | 2010072723 | * 4/2010 | ............... | G06T 7/20 |

(Continued)

OTHER PUBLICATIONS

International Search Report for PCT Application No. PCT/JP2019/016513, dated Jul. 9, 2019.

(Continued)

*Primary Examiner* — Amara Abdi

(57) ABSTRACT

In order to minimize the impact of a delay (if any) that occurs when a process for detecting an object from a video takes time, and thereby achieve accurate tracking, the object detection/tracking device according to the present invention is provided with: an acquisition unit which acquires a video; a tracking unit which tracks an object in the video; a detection unit which detects an object in the video; an association unit which associates the same objects that have been detected and tracked in the same image in the video; and a correction unit which corrects the position of the tracked object using the position of the detected object, from among the associated objects.

8 Claims, 10 Drawing Sheets

(58) Field of Classification Search
CPC .......... G06T 2207/20076; G06T 7/246; G06V 20/41; G06V 20/52
See application file for complete search history.

(56) References Cited

U.S. PATENT DOCUMENTS

| | | | |
|---|---|---|---|
| 2011/0243377 A1* | 10/2011 | Casamona | G06T 7/20 |
| | | | 382/103 |
| 2013/0136303 A1 | 5/2013 | Tsukamoto et al. | |
| 2016/0260226 A1 | 9/2016 | Yano et al. | |
| 2019/0353775 A1* | 11/2019 | Kirsch | G01S 7/4004 |
| 2021/0374421 A1* | 12/2021 | Chakraborty | G06T 7/246 |
| 2023/0041382 A1* | 2/2023 | Yoon | G06V 10/24 |

FOREIGN PATENT DOCUMENTS

| | | | | |
|---|---|---|---|---|
| JP | 2010072723 | * | 5/2010 | ............. H05N 5/232 |
| JP | 2013-114605 A | | 6/2013 | |
| JP | 2016-162232 A | | 9/2016 | |
| WO | 2013/128839 A1 | | 9/2013 | |

OTHER PUBLICATIONS

English translation of Written opinion for PCT Application No. PCT/JP2019/016513, dated Jul. 9, 2019.

* cited by examiner

OBJECT DETECTION/TRACKING DEVICE, METHOD, AND PROGRAM RECORDING MEDIUM

This application is a National Stage Entry of PCT/JP2019/016513 filed on Apr. 17, 2019, the contents of all of which are incorporated herein by reference, in their entirety.

TECHNICAL FIELD

The present invention relates to an apparatus, a method, and a program recording medium for detecting and tracking an object from a video acquired by an imaging device.

BACKGROUND ART

A device that detects and tracks an object or a person by using a camera has conventionally been proposed. In particular, in recent years, a method of tracking an object on the basis of detection called "tracking by detection" has become mainstream, and many methods of tracking within this framework have been proposed. However, processing of detecting an object from an image sometimes takes time, and this tendency is noticeable particularly in deep learning-based detection methods. Thus, a method in which a delay due to a detection time is taken into consideration has also been proposed.

For example, in PTL 1, for an object that has been tracked until a previous frame, tracking processing is performed in parallel with detection processing, and thereafter, when the detection processing ends, processing of associating a detection result with a tracking result is performed. On the other hand, if there is a new object for which the association processing has failed, in a case where the detection processing has delayed in comparison with the tracking processing, the obtained detection result is position coordinates in a past frame, and thus the position obtained as a result of the new object detection is deviated from the position in the current frame. In consideration of this, tracking means provided separately from normal tracking is used to obtain again the position in the current frame and make up for the delay in the detection processing. That is, in PTL 1, separately from first tracking means for tracking an object, which has been previously tracked, in an image at the current time, second tracking means for tracking a new object in an image at the current time is provided. This prevents a failure in tracking of the new object due to a delay in the detection processing.

CITATION LIST

Patent Literature

[PTL 1] JP 2016-162232 A

SUMMARY OF INVENTION

Technical Problem

However, PTL 1 has a problem in that, in a case where the detection processing takes time, a position obtained as a result of the tracking processing deviates from an actual position of the object, or another object is erroneously tracked, which results in tracking interruption or erroneous tracking. In a case where the position obtained as a result of the tracking processing deviates from the actual position of the object obtained as a result of the detection processing, the detection result and the tracking result are not associated with each other. As a result, a new tracking result may be generated separately from the tracking result obtained from the previous frame, and thus, two tracking results may be duplicately generated for the same object. There is a problem in that this also results in tracking interruption or erroneous tracking.

Aim of Invention

The present invention has been made in view of the above problems, and is aimed at minimizing, even in a case where detection processing takes time and delays, impact of the delay in the detection processing, and achieving accurate tracking.

Solution to Problem

A first aspect of the present invention provides an object detection/tracking device including: acquisition means for acquiring an image; tracking means for tracking an object in the image; detection means for detecting an object in the image; association means for associating the detected object with the tracked object, the objects being the same; and correction means for correcting, for the associated objects, a position of the tracked object by using a position of the detected object.

A second aspect of the present invention provides an object detection/tracking method including: acquiring a video; tracking an object in the video; detecting an object in the video; associating the detected object with the tracked object, the objects being the same object, in the same image among images in the video; and correcting, for the associated objects, a position of the tracked object by using a position of the detected object.

A third aspect of the present invention provides a program recording medium that records a program for causing a computer to execute: processing of acquiring an image; processing of tracking an object in the image; processing of detecting an object in the image; processing of associating the detected object with the tracked object, the objects being the same object; and processing of correcting, for the associated objects, a position of the tracked object by using a position of the detected object.

Advantageous Effects of Invention

The present invention reduces a delay due to detection and also reflects a detection result in tracking, thereby achieving accurate tracking.

EXAMPLE EMBODIMENT

First Example Embodiment

A first example embodiment of the present invention will be described in detail with reference to the drawings.

Figure 1:
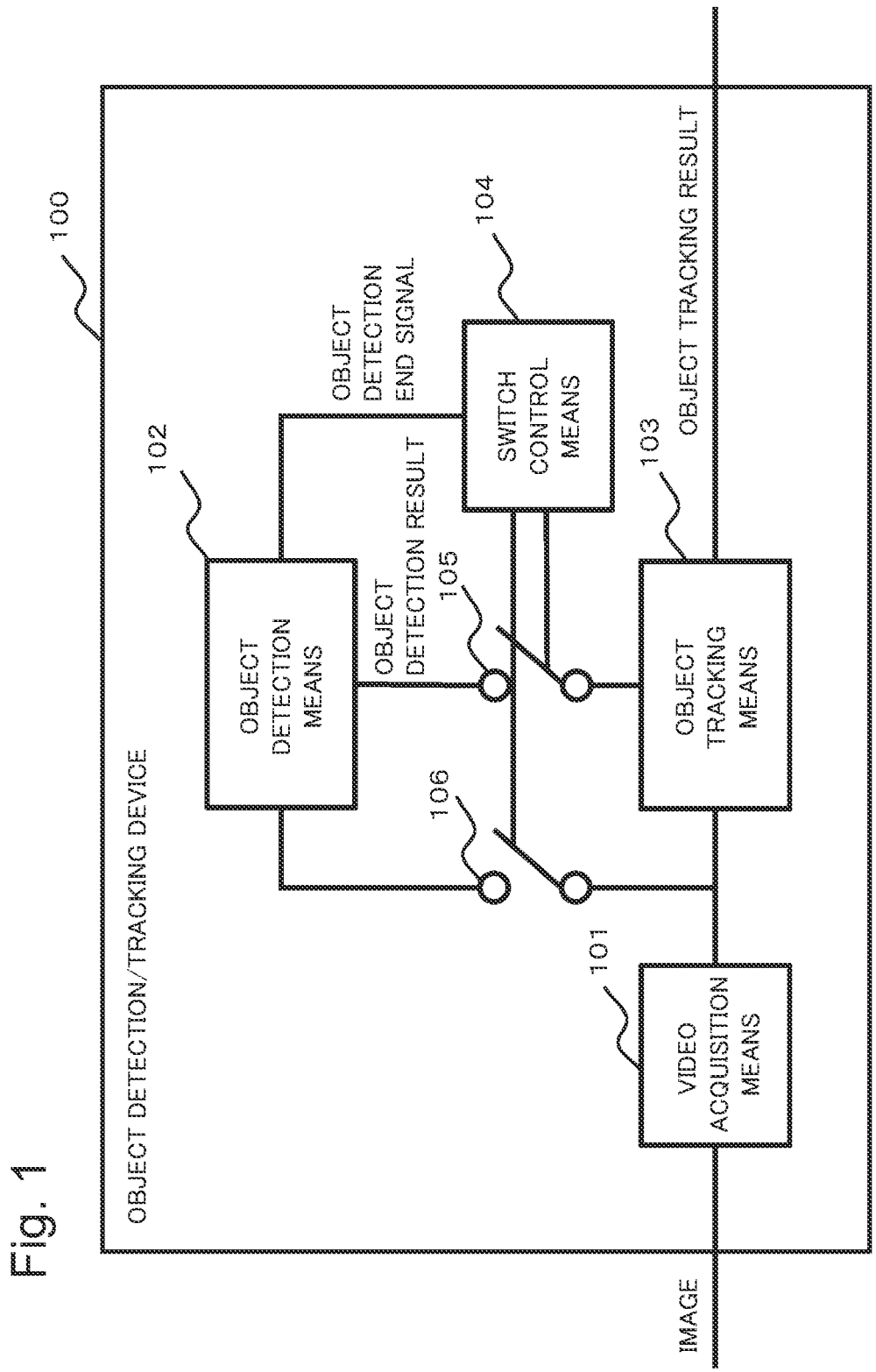
FIG. 1 is a diagram illustrating a configuration of an object detection/tracking device according to a first example embodiment.

FIG. 1 illustrates an object detection/tracking device 100 according to the present example embodiment. The object detection/tracking device 100 includes video acquisition means 101, object detection means 102, object tracking means 103, switch control means 104, switch means 105, and switch means 106.

The video acquisition means 101 acquires a video, and outputs the acquired video to the object tracking means 103 and the switch means 106. The video acquisition means 101 may acquire an image instead of a video, and output the acquired image to the object tracking means 103 and the switch means 106.

The switch means 106 switches between ON and OFF in accordance with a switch control signal output from the switch control means 104. In a case of ON, the video output from the video acquisition means 101 is output to the object detection means 102.

The object detection means 102 performs object detection on the video output from the switch means 106, and then outputs an object detection result to the switch means 105, and outputs an object detection end signal to the switch control means 104.

In accordance with the object detection end signal output from the object detection means 102, the switch control means 104 outputs a switch control signal to the switch means 105 and the switch means 106.

In accordance with the switch control signal output from the switch control means 104, the switch means 105 switches between ON and OFF. In a case of ON, the object detection result output from the object detection means 102 is output to the object tracking means 103.

On the basis of the video output from the video acquisition means 101 and the object detection result output from the switch means 105, the object tracking means 103 performs object tracking processing and outputs an object tracking result.

Next, operation of the object detection/tracking device 100 according to the present example embodiment will be described.

The video acquisition means 101 acquires, from an imaging device that images an area or an object to be monitored, a captured video or image. For example, the video acquisition means 101 may acquire a video or an image from a fixed monitor camera or a web camera, or from a camera mounted on a moving body such as an unmanned aerial vehicle (UAV) or a vehicle. Alternatively, the video acquisition means 101 may acquire a video or an image from a body-worn camera worn by a police officer or a security guard, or from a video camera with which a user captures an image. Alternatively, the video acquisition means 101 may acquire a video or an image from a camera used for a specific purpose, such as an endoscope. The video acquired by the video acquisition means 101 is output as a video sequence.

The object detection means 102 performs object detection on the image input from the video acquisition means 101, and outputs a result as an object detection result. In a case where the object is a person, a detector that has learned image features of the person is used for detection of a person area. For example, a detector that detects a person area on the basis of histograms of oriented gradients (HOG) features, or a detector that directly detects a person area from an image by using a convolutional neural network (CNN) may be used. Alternatively, a detector that has learned not the entire area but a partial area (e.g., a head) of a person may be used for detection of a person. For example, in a case where a head position and a feet position can be detected with a detector that has learned a head and feet, it is possible to specify a person area. Another example may be a configuration in which a person area is obtained by a combination of head detection information and silhouette information obtained from a background difference (information regarding an area in which there is a difference from a background model). Similarly, in a case where the object is a vehicle such as a car, a motorcycle, or a bicycle, it is possible to detect the object by using a detector that has learned image features of the vehicle. In a case where the object is a specific object other than a person or a vehicle, a detector that has learned image features of the specific object may be constructed and used.

The object detection means 102 collects pieces of information regarding a detected object and generates the information as object detection result information. Here, the object detection result information includes time information of a frame for which detection has been made (or information for specifying a frame, such as a frame number) and information regarding the detected object. The information regarding the object includes the detected position and size of the object. Here, the position of the object may be represented by a position on a image, or may be represented by a position converted into real world coordinates with a parameter representing the position or pose of the camera obtained by camera calibration. For example, in a case where the position on the image is used for the representation, coordinates of vertices (e.g., upper left and lower right vertices) of a rectangle surrounding the object may be used for the representation. Alternatively, information regarding one vertex and the width and height of a rectangle may be used for the representation. In a case where a plurality of objects is detected, the object detection result information includes information regarding the plurality of detected objects.

The object detection means 102 outputs the generated object detection result information to the switch means 105. The object detection means 102 outputs, to the switch control means 104, an object detection end signal indicating that the object detection has been ended.

When the object detection end signal is input from the object detection means 102, the switch control means 104 outputs, to the switch means 105, a signal for turning on the switch means 105 (a state in which a path is connected). When the switch means 105 is turned on, the path through which an output from the object detection means 102 is input to the object tracking means 103 is connected. As a result, the object detection result information output from the object detection means 102 is transmitted to the object tracking means 103 via the switch means 105. When the transmission of the object detection result is completed, the switch means 105 returns to the OFF state (a state in which the path is interrupted).

When the object detection end signal is input from the object detection means 102, the switch control means 104 outputs, to the switch means 106, a signal for turning on the switch means 106 (a state in which a path is connected). When the switch means 106 is turned on, the path through which an image output from the video acquisition means 101 is input to the object detection means 102 is connected. As a result, a video frame at that time is input from the video acquisition means 101 to the object detection means 102, and the object detection means 102 performs processing on the frame. When the transmission of the video frame is completed, the switch means 106 returns to the OFF state (a state in which the path is interrupted).

The object tracking means 103 holds a tracking result of an object in a past frame, obtains the position where the object to be tracked exists in an input frame image on the basis of the tracking result, and generates and outputs object tracking result information. In a case of a frame to which the object detection result information is input, the object tracking means 103 also uses the object detection result information to perform the tracking processing. That is, a correspondence relationship between the object to be tracked and the object detection result is obtained, and the object detection result is reflected in the result of object tracking.

Here, in a case where the object detection processing by the object detection means 102 takes longer than a time interval between frames, the time of the object detection result information is earlier than the time of the frame image input from the video acquisition means 101. In this case, the imaging time of a detection target frame and that of a tracking target frame do not coincide with each other. In particular, this tendency becomes noticeable in a case where object detection is performed on the basis of a method in which the processing load is high, such as deep learning. Thus, the object tracking means 103 obtains a correspondence relationship between the information regarding the object included in the object detection result and the object to be tracked in consideration of this time difference, and reflects the correspondence relationship in the result of object tracking. Details of the operation of the object tracking means 103 will be described later. The object tracking means 103 outputs the generated object tracking result information.

Here, the object tracking result information includes time information regarding the time at which the image has been captured (or information for identifying the frame such as a frame number), the position and size of the object in the image, and ID information assigned to each object to be tracked. Position information can be described by any method, and may be indicated by information regarding a circumscribed rectangle of the tracked object. Alternatively, coordinates of one point in the area of the tracked object may be obtained, and then size information may be indicated by relative information based on the point. Alternatively, the position may be converted into coordinates in a real space and output. For example, in a case where the position on the image is used for the representation, coordinates of vertices (e.g., upper left and lower right vertices) of a rectangle surrounding the object may be used for the representation. Alternatively, information regarding one vertex and the width and height of a rectangle may be used for the representation.

Next, the object tracking means 103 according to the present example embodiment will be described with reference to FIG. 2.

Figure 2:
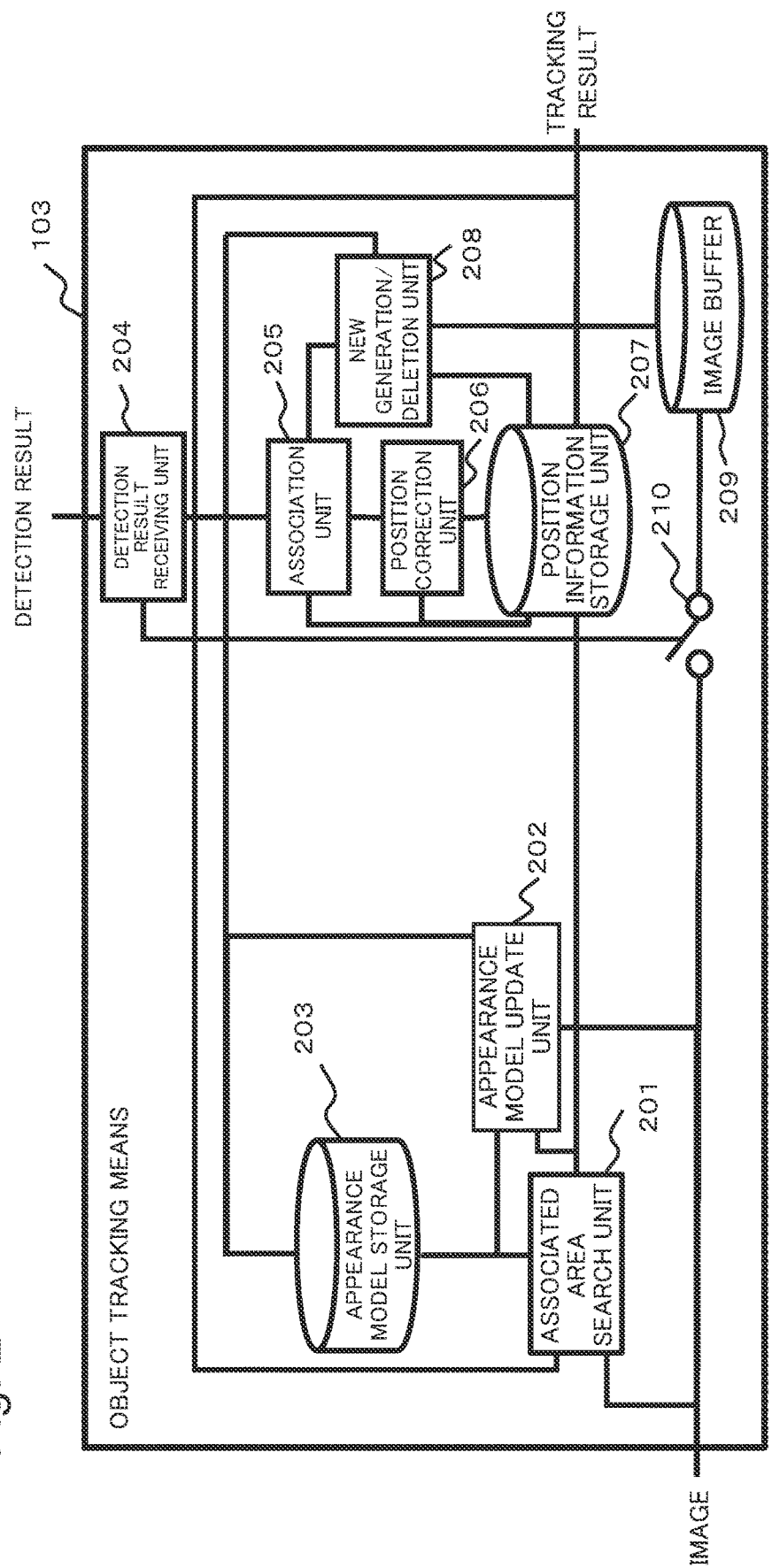
FIG. 2 is a diagram illustrating a configuration of object tracking means according to the first example embodiment.

FIG. 2 illustrates a configuration of the object tracking means 103 according to the present example embodiment. The object tracking means 103 according to the present example embodiment includes an associated area search unit 201, an appearance model update unit 202, an appearance model storage unit 203, a detection result receiving unit 204, an association unit 205, a position correction unit 206, a position information storage unit 207, a new generation/deletion unit 208, an image buffer 209, and a switch unit 210.

The image buffer 209 stores an image input through the switch unit 210.

The position information storage unit 207 stores the information regarding the position of the tracked object.

The appearance model storage unit 203 stores appearance model information of the tracked object.

The detection result receiving unit 204 receives an object detection result, and then outputs the detection result to the association unit 205, and also outputs a switch control signal to the switch unit 210.

The association unit 205 associates the detected object with the tracked object from the detection result output from the detection result receiving unit 204 and the information regarding the position of the tracked object stored in the position information storage unit 207. The association unit 205 outputs an association result to the position correction unit 206 and the new generation/deletion unit 208.

The position correction unit 206 corrects the information regarding the position of the tracked object already stored in the position information storage unit 207 on the basis of the association result output from the association unit 205, and outputs the corrected information regarding the position of the tracked object to the position information storage unit 207.

The new generation/deletion unit 208 determines whether there is a newly detected object or an object to be deleted on the basis of the association result output from the association unit 205 and the image at the time of detection stored in the image buffer 209. In a case where it is determined that there is a new object, the new generation/deletion unit 208 stores the position of the new tracked object in the position information storage unit 207. In a case where it is determined that there is an object to be deleted, the new generation/deletion unit 208 deletes information regarding the object from the position information storage unit 207. The new generation/deletion unit 208 generates appearance model information of the object, and stores the information in the appearance model storage unit 203.

The associated area search unit 201 generates an object tracking result on the basis of the appearance model information of the object stored in the appearance model storage unit 203 and the input image, and outputs the tracking result to the position information storage unit 207 and the appearance model update unit 202.

The appearance model update unit 202 updates the appearance model information of the tracked object on the basis of the input image, the object tracking result output from the associated area search unit 201, and the object appearance model information stored in the appearance model storage unit 203. The appearance model update unit 202 stores the updated appearance model information of the tracked object in the appearance model storage unit 203.

The switch unit 210 outputs the input image to the image buffer 209 in accordance with the switch control signal output from the detection result receiving unit 204.

Next, an operation of the object tracking means 103 according to the present example embodiment will be described.

First, information stored in the position information storage unit 207 will be described. The position information storage unit 207 stores information regarding the position of the object to be tracked, a tracking ID for identifying the tracking target, and time information (or information for identifying the frame such as a frame number). The position information is information indicating the position of the tracking target in the image, and is, for example, information regarding a circumscribed rectangle surrounding the object. The position information may be represented by coordinates of the upper left and lower right vertices of a rectangle, or may be represented by coordinates of a specific position in the rectangle (e.g., coordinates of one vertex or coordinates of a center point of the rectangle), and width and height values. The position information may include coordinates converted into a real space coordinate system. This value can be obtained by using a camera parameter obtained by calibration. For example, a position at which the object is in contact with the ground in the image may be obtained, and the coordinates of this position may be converted into real space coordinates and stored.

Furthermore, the position information storage unit 207 also stores tracking likelihood information of the object to be tracked. The tracking likelihood information is information indicating a confidence with which the tracking target actually exists and is being correctly tracked. The value of the tracking likelihood information is increased in a case where the confidence of tracking is high, for example, a tracking result is associated with detection or a score of the tracking processing increases.

The position information storage unit 207 stores not only the latest information but also tracking result information for a certain period of time for each object. For example, in a case where data of past N frames is stored, the position information storage unit 207 may store up to tracking result information in a frame at a time N frames back from the current frame, and may delete results before that.

The position information storage unit 207 may also store accompanying information other than the information described above. For example, the position information storage unit 207 may also store information indicating whether the tracked object has been associated with the detected object included in the detection result. In a case where the tracked object has been associated with the detected object, the position information storage unit 207 may also store information regarding the object (e.g., a detection score indicating certainty of detection). The position information storage unit 207 may also store latest association time information.

When the object detection processing ends, the object detection result information is input to the detection result receiving unit 204. The detection result receiving unit 204 outputs the received detection result information to the association unit 205, and outputs, to the switch unit 210, a switch control signal for turning on the switch unit 210.

When the switch control signal for turning on the switch unit 210 is input, the switch unit 210 connects a path such that an input image is input to the image buffer 209. Then, when transmission of the image to the image buffer 209 is completed, the switch unit 210 returns to the OFF state (disconnected state). The timing at which the switch unit 210 is turned on coincides with the timing at which the switch means 106 is turned on, and the image input to the image buffer 209 coincides with the image to be subjected to the next object detection by the object detection means 102.

When the image is input, the image buffer 209 stores the image. However, images previously input at the timing when the switch unit 210 is turned on are also stored for a period during which the images are necessary for processing (e.g., a period from when an image is input to when the image is used for processing of extracting an appearance feature of an object to be described later). An image input at a previous timing is deleted from the image buffer 209 when the image becomes unnecessary.

The association unit 205 reads the information regarding the position of the object to be tracked and the tracking likelihood information accompanying the position information stored in the position information storage unit 207. The association unit 205 compares the information regarding the position of the object to be tracked and the tracking likelihood information accompanying the position information with the position information included in the object detection result information, and associates each detected object with a corresponding object to be tracked. At this time, the association unit 205 compares pieces of position information at the same time (or the same frame) on the basis of the time information (or information for specifying the frame, such as a frame number) included in the object detection result information.

Specifically, when the time of the latest tracking result stored in the position information storage unit 207 is expressed by T and the detection time is expressed by Td (the time Td is earlier than the time T), the association unit 205 reads the tracking result at the time Td, which is earlier than the time T, from the position information storage unit 207, and associates the tracking result with the detection result. Various existing methods can be used as a method of the association. For example, the association unit 205 can obtain an association likelihood representing the ease of association between the detected object and the object to be tracked, convert the likelihood into a cost by using a monotone non-increasing function, and use a method such as the Hungarian method to perform association. At this time, the association unit 205 can obtain the association likelihood on the basis of, for example, an overlap ratio between the rectangle of the detected object and the rectangle of the object to be tracked (e.g., a value obtained by converting the overlap ratio by using a monotone non-decreasing function).

The detection result may include the appearance feature of the detected object. In this case, the association unit 205 may also obtain an index indicating appearance similarity between the detected object and the object to be tracked by also using appearance model information stored in the appearance model storage unit 203 to be described later, and determine the association likelihood in consideration of the index. For example, the association unit 205 may obtain the association between the tracked object and the detected object on the basis of a value obtained by multiplying the association likelihood obtained on the basis of the above-described overlap ratio by the index indicating the appearance similarity, or a value obtained by weighted addition.

In a case of an object to be tracked in which the detection result and the tracking result have been associated with each other as a result of association, the association unit 205 outputs, to the position correction unit 206, the tracking ID of the object to be tracked and information regarding the detected object associated with the tracking result including position information. Accompanying this is that the association unit 205 outputs, to the position correction unit 206, the tracking likelihood information of the object to be tracked. At this time, since it is considered that success in association means that the confidence of existence of the tracking target has increased, the association unit 205 may output the tracking likelihood value after making the value larger than the tracking likelihood value read from the position information storage unit 207 before the processing. Specifically, the association unit 205 may, for example, multiply the original tracking likelihood by a value larger than 1.

On the other hand, in a case of an object to be tracked that has not been associated with the detection result (unassociated object to be tracked), it is considered that the confidence of existence of the object has decreased. Thus, the association unit 205 performs processing of lowering the tracking likelihood, and outputs the tracking ID and the tracking likelihood information to the new generation/deletion unit 208. Specifically, the association unit 205 may, for example, multiply the original tracking likelihood by a value smaller than 1. The position information storage unit 207 may store the time of the last association (hereinafter referred to as "latest association time"). In this case, a difference between the detection time and the latest association time (hereinafter referred to as "unassociated state duration time") may be obtained, and the degree of changing the tracking likelihood may be changed in accordance with the magnitude of the difference. For example, in a case where the unassociated state has continued for a while and the unassociated state duration time is long, the rate of decreasing the tracking likelihood may be increased.

In a case where there is a detected object that has not been associated with the object to be tracked, the association unit 205 outputs information regarding the detected object to the new generation/deletion unit 208 as a new object to be tracked. This occurs when a new object enters from outside the image and is detected, or when an object that has existed in the image but has not been detected is detected.

On the basis of information regarding the position (including the size) of the detected object corresponding to the tracked object associated with the detection result input from the association unit 205, the position correction unit 206 corrects the information regarding the position of the object. At this time, not only the position information in the tracking result at the same time as the detection time but also the position information in the tracking result of the object from the detection time to the current time are corrected. That is, the position correction unit 206 corrects not only the position information in the tracking result at the detection time Td but also the position information in the tracking result at the time t, in which Td<t≤T holds.

Various methods can be considered as a method of correcting the position. For example, in a case where the tracking result and the detection result are rectangles, a difference in distance between the center of the rectangle of the detection result and the center of the rectangle of the tracking result is obtained, and the center of the tracking rectangle is shifted by the difference so as to overlap the center of the detection rectangle. That is, a difference between the centers is obtained between the detection result and the tracking result at the same time as the detection time, and the difference is added to the position information (tracking rectangle information) in the tracking result at a time after the detection time stored in the position information storage unit 207 so that the position is corrected. Alternatively, only the rectangle at the latest time may be changed. In addition to simply shifting the position, it is possible to also change the size of the rectangle. For example, after the tracking rectangle has been shifted by the above-described method, the values of the width and height of the rectangle may be changed so that the tracking rectangle coincides in size with the detection rectangle. In a case where information regarding the rectangle is represented by coordinates of the upper left and lower right vertices, the coordinates of the upper left and lower right vertices may be changed so that the values of the width and height of the rectangle becomes the same as those of the detection rectangle.

The corrected information regarding the position of the object is stored in the position information storage unit 207. The tracking likelihood information accompanying the position information is also stored in the position information storage unit 207. In a case where the position information storage unit 207 stores information at the latest association time, the latest association time is also updated to this detection time Td.

On the other hand, the new generation/deletion unit 208 generates a tracking result for a newly detected object and determines an object that is considered to no longer exist (or have been erroneously detected) among objects to be tracked.

The new object is an object that has not been associated with any object to be tracked among objects included in detection results. This occurs when a new object enters from outside the image and is detected, or when an object that has existed in the image but has not been detected is detected.

The new generation/deletion unit 208 performs new object addition processing. Specifically, the new generation/deletion unit 208 assigns a new tracking ID to such a new object, and adds the new object to the objects to be tracked. Then, position information is calculated, and appearance model information is constructed.

In the calculation of the position information by the new generation/deletion unit 208, the new generation/deletion unit 208 converts information regarding the position and size of the object included in the detection result into information regarding the position of the object to be tracked. In a case where the position information for detection and that for tracking are in the same format, the information regarding the position of the object included in the detection result may be used as position information of the tracking target as it is. In a case where the formats are different, the new generation/deletion unit 208 converts the information into position information for tracking. For example, in a case where the information regarding the detected object is coordinates on the image and the position information for tracking is described in real world coordinates, the new generation/deletion unit 208 performs processing of conversion into real world coordinates. This conversion can be performed by a known method using a camera parameter.

In the construction of an appearance model by the new generation/deletion unit 208, the new generation/deletion unit 208 extracts a visual feature of the object used for object tracking, and constructs a model. For example, the new generation/deletion unit 208 extracts features representing the color, shape, and pattern of the object from an image, and constructs a template. As the features of the color, shape, and pattern, various existing features can be used, and for example, features standardized by Moving Picture Experts Group (MPEG)-7 can be used. Alternatively, the new generation/deletion unit 208 may construct a model by using features extracted by deep learning. Alternatively, features may be extracted from a part of the object area instead of the entire object area. Furthermore, instead of one area, the object area may be divided into a plurality of areas and a template may be provided for each area. As a method for this selection of a plurality of areas, various methods such as a method in which an area is evenly divided into grids and a method in which areas are selected on the basis of a specific part of an object can be applied. It is also possible to retain features outside an object area as a negative template, and used the negative template together with a template (positive template) of an object in tracking. It is also possible to extract features not only from a new object but also from another object associated with detection, and retain templates extracted from a plurality of frames at different times. In this case, it is also possible to construct a template only for one frame at the time of first appearance model construction, and then increase the number of templates as the tracking processing proceeds. At this time, in addition to simply increasing the number of templates, it is possible to also perform a control so that the number of templates becomes a predetermined number. Alternatively, the new generation/deletion unit 208 may integrate image features obtained from different frames to construct and hold an appearance model.

The position information thus generated by the new generation/deletion unit 208 is stored in the position information storage unit 207 together with time information (or information specifying a frame) and tracking ID information in a similar manner to other objects to be tracked. On the other hand, the appearance model information is stored in the appearance model storage unit 203 together with time information (or information specifying a frame) and ID information of the object in a similar manner to other objects to be tracked.

Determination of an object to be deleted by the new generation/deletion unit 208 is performed on an object to be tracked without association. The new generation/deletion unit 208 regards an object whose tracking likelihood has decreased to a value equal to or less than a deletion threshold, among objects to be tracked without association, as an object that has disappeared to the outside of the image or an object that has hidden behind an obstacle or the like in the image and has already disappeared. In this case, the new generation/deletion unit 208 deletes the position information corresponding to the tracking ID of the object from the position information storage unit 207. In a similar manner, the new generation/deletion unit 208 deletes the appearance model information corresponding to the tracking ID from the appearance model storage unit 203. In a case of an object whose tracking likelihood is larger than the deletion threshold, among the objects to be tracked without association, the new generation/deletion unit 208 does not perform deletion processing, and changes only the value of the tracking likelihood stored in the position information storage unit 207 to an updated value.

The position information of the tracking target updated in this manner is output as tracking result information. The information is also output to the associated area search unit 201, and is used for tracking for the next frame.

On the basis of the latest position information (including size information) of each object to be tracked stored in the position information storage unit 207, the associated area search unit 201 obtains the position of the object to be tracked in the input frame image at the current time. Specifically, the associated area search unit 201 sets a search range around the latest position information in the frame image, and obtains an area having the highest possibility of the tracking target in the range. That is, the associated area search unit 201 obtains an area whose feature, which is extracted from each area in the search area, is the most similar to the object to be tracked that is included in appearance model feature information. Then, the associated area search unit 201 outputs information regarding the obtained area as a tracking result in the current frame of the object to be tracked. The associated area search unit 201 updates the tracking likelihood information indicating certainty of tracking in accordance with certainty of the associated area search, and outputs the updated tracking likelihood information together with the tracking result. For example, in a case where a tracking score indicates the certainty of tracking, the tracking score may be used as it is as the tracking likelihood. Alternatively, in a case where another object being tracked exists nearby, or in a case where there is a place where erroneous detection is likely to occur, the likelihood may be lowered in consideration of the degree thereof.

There may be no associated area due to occlusion, disappearance to the outside of the image, or the like, and in a case where there is no associated area, the associated area search unit 201 outputs a result "no associated area". In this case, the tracking likelihood is lowered and updated, and then output together with the tracking result.

The associated area search unit 201 outputs the generated object tracking result information to the appearance model update unit 202 and the position information storage unit 207.

The appearance model update unit 202 updates the appearance model information of each object to be tracked. The appearance model update unit 202 obtains the position of the object in the image on the basis of the position information obtained by the associated area search unit 201, and extracts the feature of the corresponding image area. The appearance model update unit 202 performs update with a feature obtained by weighted averaging of the extracted feature and the feature originally stored in the appearance model storage unit 203. Alternatively, the appearance model update unit 202 may perform replacement with a new feature instead of weighted averaging. Alternatively, the appearance model update unit 202 may use various other methods of updating time series data other than weighted averaging. In a case where a plurality of templates are retained, one or a plurality of the templates may be updated by the above-described method. In a case where, for example, a part of the object is hidden, only a template corresponding to a portion that is not hidden may be updated. Alternatively, the value of the weight at the time of update may be adjusted in accordance with the degree of hiding.

Finally, the latest position information of each object to be tracked stored in the position information storage unit 207 is output as tracking result information. Since the latest position information is output here, a tracking result without delay is output without being affected by a delay due to detection.

Figure 3:
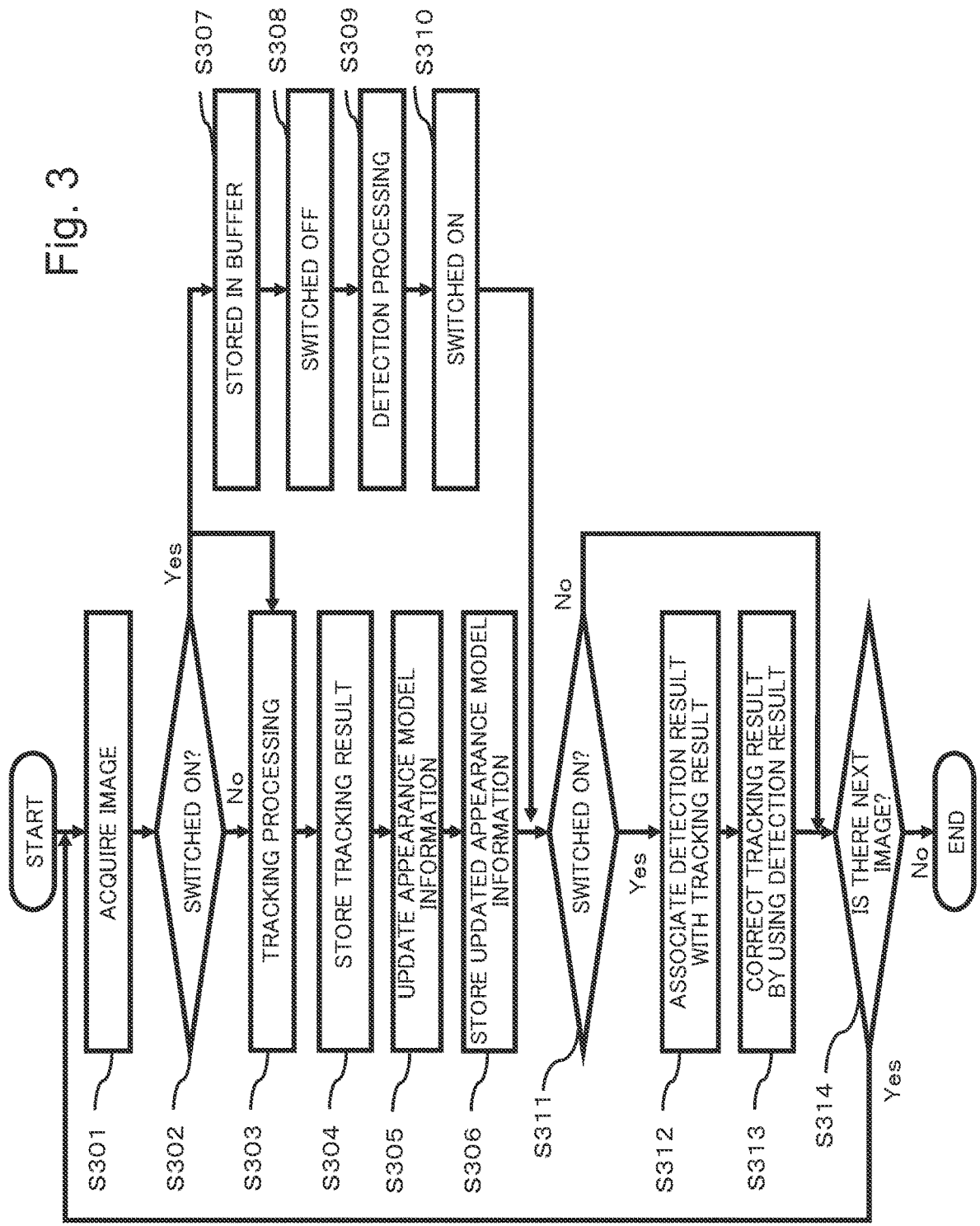
FIG. 3 is a flowchart illustrating a processing operation of the object detection/tracking device according to the first example embodiment.

Here, a flow of processing by the object detection/tracking device according to the present example embodiment will be described with reference to a flowchart in FIG. 3.

The video acquisition means 101 acquires an image (S301). If the switch means 106 and the switch unit 210 are OFF (No in S302), the object tracking means 103 tracks an object in the acquired image (S303), and stores a tracking result in the position information storage unit 207 (S304). The appearance model update unit 202 updates an appearance model on the basis of the information regarding the position of the tracked object (S305), and stores the updated appearance model in the appearance model storage unit 203 (S306).

On the other hand, if the switch means 106 and the switch unit 210 are ON (Yes in S302), the acquired image is output to the object detection means 102 and stored in the image buffer 209 in parallel with the processing in S303 to S306 (S307). Thereafter, the switch means 106 and the switch unit 210 are turned off (S308). Furthermore, in parallel with the processing in S303 to S306, the object detection means 102 detects the object in the acquired image (S309). When the detection of the object ends, the switch control means 104 turns on the switch means 106 and the switch unit 210 (S310).

However, since the detection processing (S309) takes time, the detection processing may not be completed at the end of S306, and the switches may not be turned on in S310. If the switches are ON (Yes in S311), the association unit 205 associates the detected object with the tracked object, the objects being the same object, in the same image among the acquired images (S312). For the associated object, the position correction unit 206 corrects the position of the tracked object by using the position of the detected object (S313). On the other hand, if the switches are OFF (No in S311), the detection result does not exist yet, and thus these pieces of processing are skipped. Then, if there is a next image (Yes in S314), the video acquisition means 101 waits until the next image is acquired. If there is no next image (No in S314), the video acquisition means 101 ends the processing.

Figure 4:
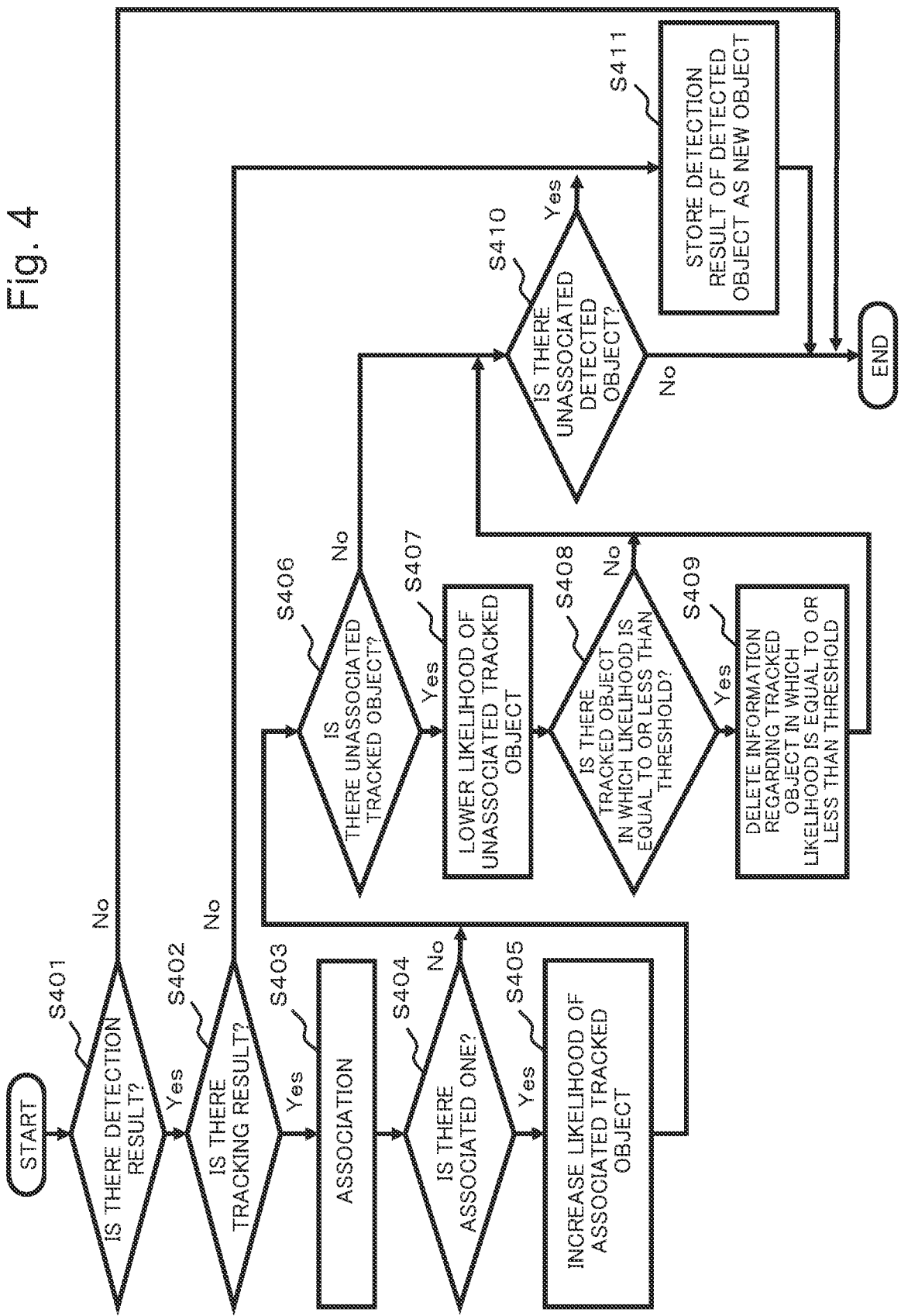
FIG. 4 is a flowchart illustrating details of association processing of the object detection/tracking device according to the first example embodiment.

Furthermore, details of the association processing in S312 will be described with reference to a flowchart in FIG. 4.

If there is no detection result for the object in the acquired image (No in S401), it is not necessary to perform association, and thus the association unit 205 ends the processing. If there is a detection result (Yes in S401), the association unit 205 checks whether there is a tracking result. If there is no tracking result (No in S402), the new generation/deletion unit 208 generates the detected object as a new tracked object, and stores information regarding the position of the detected object in the position information storage unit 207. Furthermore, the new generation/deletion unit 208 constructs an appearance model, stores the appearance model in the appearance model storage unit 203 (S411), and ends the processing. On the other hand, if there is a tracking result (Yes in S402), the association unit 205 associates the detected object with the tracked object (S403).

Next, the association unit 205 checks the result of the association, and performs, if object detection results include the detected object associated with the tracked object (Yes in S404), an update in which the likelihood of the associated tracked object is increased (S405). On the other hand, if there is no tracked object associated with the detected object (No in S404), the processing in S405 is skipped.

Next, the association unit 205 checks whether there is an unassociated tracked object that has not been associated with any detected object, and performs, if there is an unassociated tracked object (Yes in S406), processing of lowering the likelihood of the unassociated tracked object (S407). Then, the new generation/deletion unit 208 checks whether there is a tracked object whose likelihood is equal to or less than the deletion threshold. If there is a tracked object whose likelihood is equal to or less than the deletion threshold (Yes in S408), the new generation/deletion unit 208 deletes information regarding the position of the tracked object whose likelihood is equal to or less than the deletion threshold and related information such as the appearance model (S409). If there is no tracked object whose likelihood is equal to or less than the deletion threshold (No in S408), this processing is skipped. On the other hand, if there is no unassociated tracked object (No in S406), the processing from S407 to S409 is skipped.

Next, the association unit 205 checks whether there is an unassociated detected object that has not been associated with any tracked object. If there is an unassociated detected object (Yes in S410), the new generation/deletion unit 208 performs the above-described processing of generating the new tracked object on the unassociated detected object (S411), and ends the processing.

As described above, the object tracking/detection device according to the present example embodiment reflects a result associated with a detection input in a delayed manner also in the latest tracking result, and uses the result for the subsequent tracking. This allows a detection result to be appropriately reflected not only in a newly detected object but also in other objects, and accurate tracking can be performed. Since the image buffer stores only a minimum number of images, it is possible to perform accurate tracking while reducing a required storage capacity.

Second Example Embodiment

Next, a second example embodiment of the present invention will be described in detail with reference to the drawings.

Figure 5:
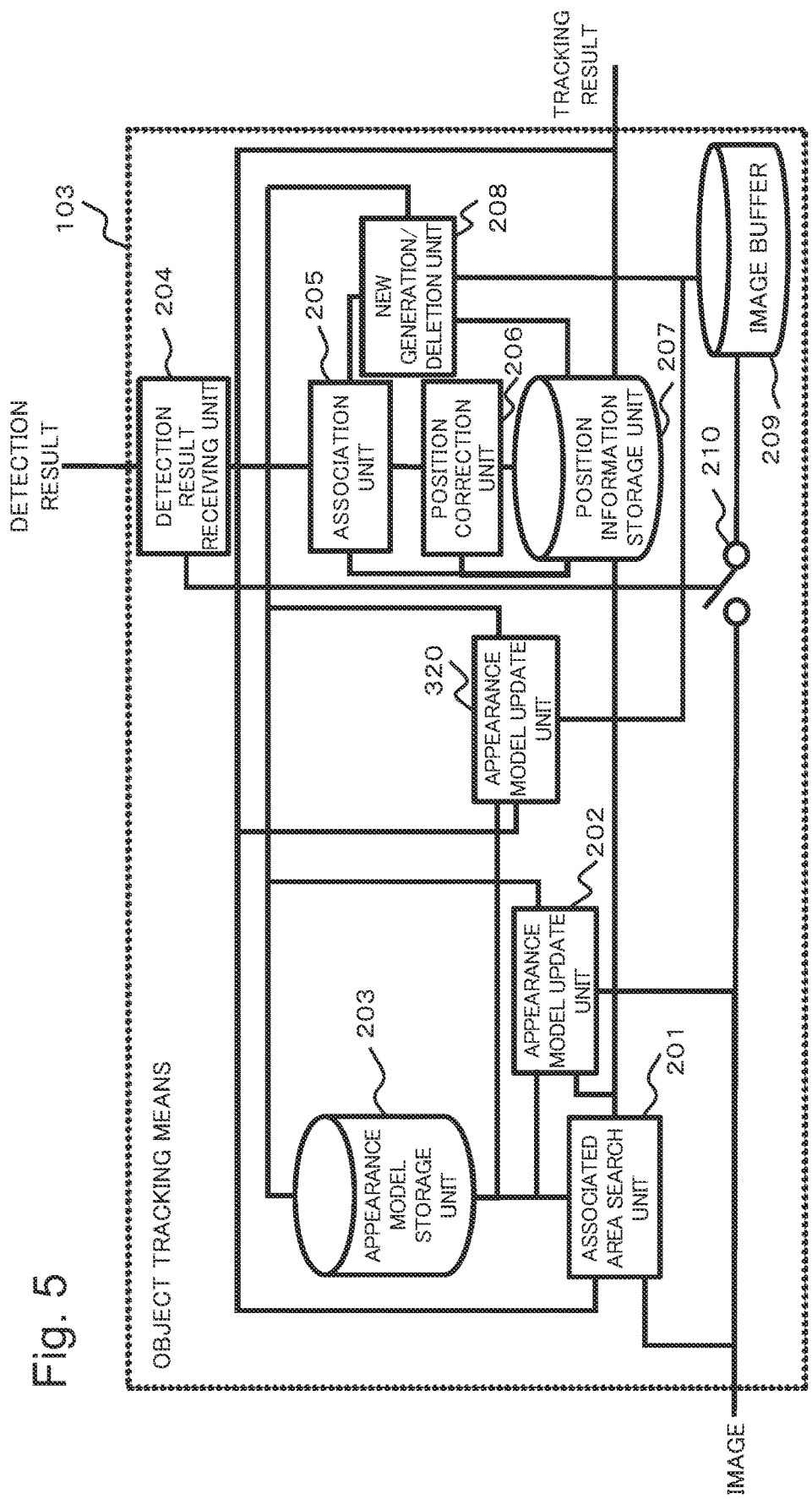
FIG. 5 is a diagram illustrating a configuration of object tracking means according to a second example embodiment.

FIG. 5 illustrates a configuration of object tracking means 103 according to the present example embodiment. The object tracking means 103 according to the present example embodiment includes an associated area search unit 201, an appearance model update unit 202, an appearance model storage unit 203, a detection result receiving unit 204, an association unit 205, a position correction unit 206, a position information storage unit 207, a new generation/deletion unit 208, an image buffer 209, a switch unit 210, and an appearance model update unit 320.

The object tracking means 103 according to the present example embodiment is different from the object tracking means 103 according to the first example embodiment in that the object tracking means 103 according to the present example embodiment includes the appearance model update unit 320.

The relationship of connection excluding the appearance model update unit 320 is similar to that of the object tracking means 103 according to the first example embodiment.

The appearance model update unit 320 updates an appearance model of a tracked object on the basis of information regarding the position of the tracked object stored in the position information storage unit 207 and image information stored in the image buffer 209. The appearance model update unit 320 stores the updated appearance model information in the appearance model storage unit 203.

Next, an operation of the object tracking means 103 according to the present example embodiment will be described.

Operations other than that of the appearance model update unit 320 are similar to those in the first example embodiment. Thus, only the processing operation of the appearance model update unit 320 will be described below.

The appearance model update unit 320 updates an appearance model for an object to be tracked associated with an object in a detection result. First, the appearance model update unit 320 reads an image corresponding to a detection time Td from the image buffer 209. The appearance model update unit 320 extracts an appearance feature of the object from the image on the basis of the corrected information regarding the position of the object output from the position information storage unit 207. Then, the appearance model update unit 320 performs update by also using appearance model information of the object to be tracked stored in the appearance model storage unit 203. The appearance model is updated by a method similar to that in the case of the appearance model update unit 202. The updated appearance model is output to and stored in the appearance model storage unit 203.

Processing of deleting the image at the time Td in the image buffer 209 is performed after processing by both the new generation/deletion unit 208 and the appearance model update unit 320 has been completed.

As described above, the object tracking/detection device according to the present example embodiment updates an appearance model by using a detection result. As a result, even in a case where tracking fails due to displacement of a tracking position caused by a change in posture of an object being tracked or the like, tracking processing can be performed with the use of an updated appearance model, and this improves the accuracy of the subsequent tracking.

Third Example Embodiment

A third example embodiment of the present invention will be described in detail with reference to the drawings.

Figure 6:
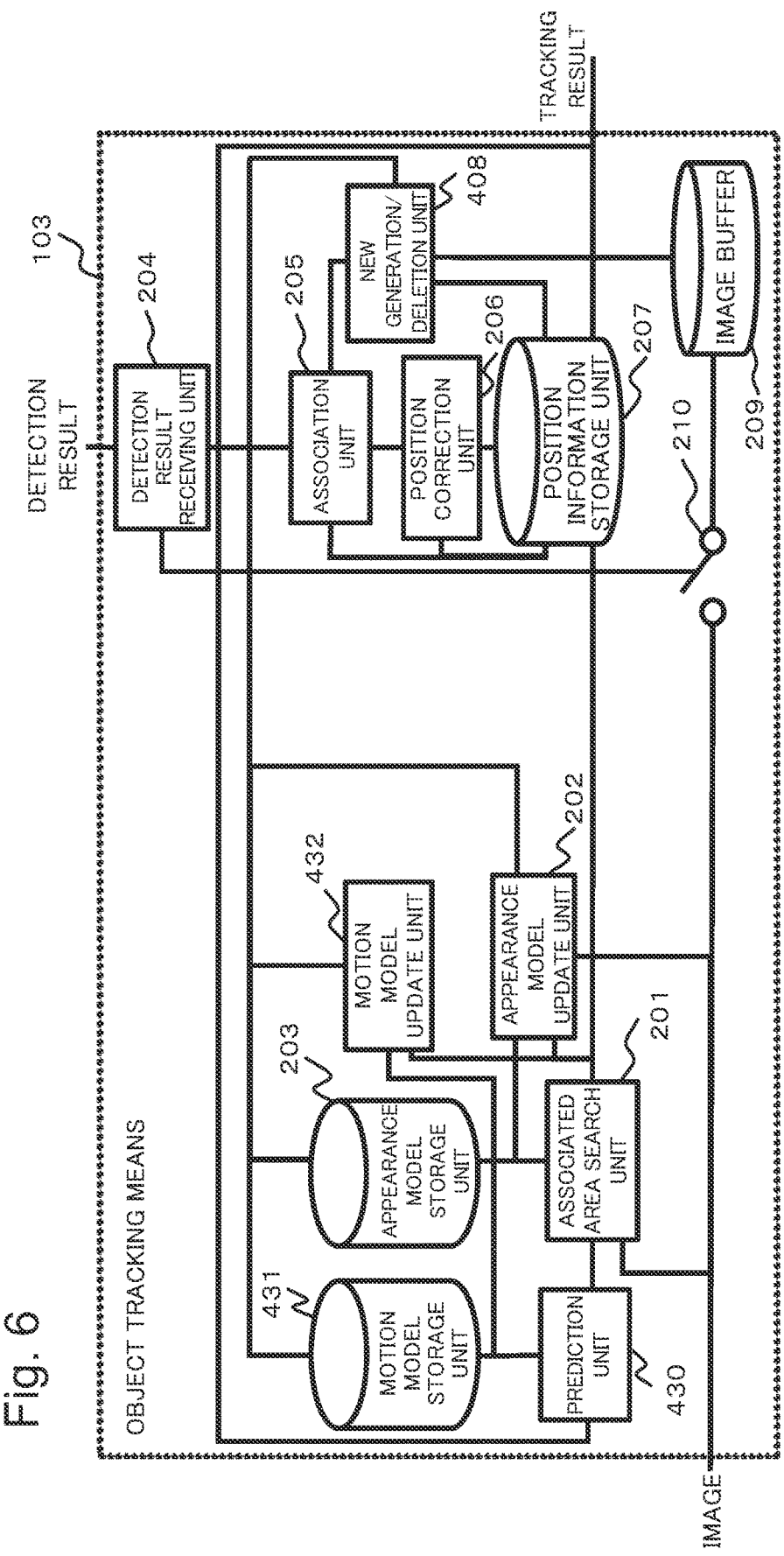
FIG. 6 is a diagram illustrating a configuration of object tracking means according to a third example embodiment.

FIG. 6 illustrates a configuration of object tracking means 103 according to an example embodiment. The object tracking means 103 according to the present example embodiment includes an associated area search unit 201, an appearance model update unit 202, an appearance model storage unit 203, a detection result receiving unit 204, an association unit 205, a position correction unit 206, a position information storage unit 207, a new generation/deletion unit 408, an image buffer 209, a switch unit 210, a prediction unit 430, a motion model storage unit 431, and a motion model update unit 432.

The object tracking means 103 according to the present example embodiment is different from the object tracking means 103 according to the first example embodiment in that the object tracking means 103 according to the present example embodiment includes the new generation/deletion unit 408 instead of the new generation/deletion unit 208, and newly includes the prediction unit 430, the motion model storage unit 431, and the motion model update unit 432.

Components of the object tracking means 103 according to the present example embodiment will be described.

The motion model storage unit 431 stores motion model information of a tracked object.

The prediction unit 430 obtains a predicted position of the tracked object on the basis of the motion model information of the tracked object stored in the motion model storage unit 431, and outputs information regarding the predicted position of the tracked object to the associated area search unit 201.

The associated area search unit 201 receives an input of the information regarding the predicted position of the object output from the prediction unit 430 instead of position information in a tracking result. The object tracking result output from the associated area search unit 201 is output to the position information storage unit 207 and the appearance model update unit 202, and is also output to the motion model update unit 432.

The motion model update unit 432 updates the motion model information of the tracked object on the basis of the motion model information of the tracked object stored in the motion model storage unit 431 and the object tracking result output from the associated area search unit 201. The motion model update unit 432 stores the updated motion model information in the motion model storage unit 431.

The new generation/deletion unit 408 determines a newly detected object or an object to be deleted on the basis of an association result output from the association unit 205 and an image at the time of detection stored in the image buffer 209. In accordance with a result of the determination, the new generation/deletion unit 408 stores the position of the new tracked object in the position information storage unit 207, and deletes information regarding the object to be deleted from the position information storage unit 207. The new generation/deletion unit 408 generates appearance model information of the object, and stores the appearance model information in the appearance model storage unit 203. The new generation/deletion unit 408 generates motion model information, and stores the motion model information in the motion model storage unit 431.

Next, an operation of the object tracking means 103 according to the present example embodiment will be described.

Processing operations of components other than the prediction unit 430, the motion model storage unit 431, the motion model update unit 432, and the new generation/deletion unit 408 are similar to those in the first example embodiment. Thus, processing operations of the prediction unit 430, the motion model storage unit 431, the motion model update unit 432, and the new generation/deletion unit 408 will be described below.

The motion model storage unit 431 stores information obtained by modeling a motion of each object being tracked in association with a tracking ID.

For example, in a case where a linear motion model is used on the basis of an assumption that a motion of an object can be approximated by a uniform linear motion, a motion vector between frames obtained from a history of past positions is stored as a motion model. Since the size of the object in the image also changes in a case where, for example, the object moves in an optical axis direction of a camera, information regarding the change in size may also be included in the motion model. For example, in a case where it is assumed that the size of a rectangle of the object linearly changes, the rate of change (enlargement/reduction ratio) may be included in the motion model of the object.

Alternatively, the motion may be modeled with the use of a Kalman filter, a particle filter, or the like. In a case where a Kalman filter is used, for example, a four-dimensional vector constituted by a two-dimensional position and a velocity in an image is used as a state variable, and parameters describing a state equation and an observation equation of the Kalman filter are stored as motion model information. The two-dimensional position in the image is, for example, coordinates of the center of the rectangle or the center of the lower side of the rectangle. On the other hand, in a case of a particle filter, in addition to a parameter describing the motion, the number of particles to be used, information regarding the state of each particle, a parameter of the magnitude of random noise used to determine the position of each particle, and the like are stored as motion model information. Similarly, other motion models can be used.

The prediction unit 430 predicts the position of the object in the current frame from the position of the object in the past on the basis of each motion model for each object to be tracked. This uses a method in accordance with the motion model to be used.

In a case where a linear motion model is used, the prediction unit 430 adds a motion vector to a position in a previous frame to predict the current position. In a case where the time intervals are not equal, the motion vector is expanded or contracted in consideration of the change in time difference, and then added. In a case of taking into consideration not only a motion but also a change in size, the prediction unit 430 may multiply the size of the object in a previous frame by the rate of change in size to predict the size of the object in the current frame. Also in this case, in a case where the time intervals are not equal, the rate of change in size is changed in consideration of the change in time difference.

In a case where a Kalman filter is used, the prediction unit 430 obtains a predicted value of the state variable in the current frame from the value of the state variable in the previous frame on the basis of the state equation of the Kalman filter. In a case where a particle filter is used, the prediction unit 430 adds a motion of the object as a whole to the position of each particle in the previous frame, adds random noise for each particle, and predicts the position of each particle. In both of the case of the Kalman filter and the case of the particle filter, in a case where the size of the object in the image changes, the change in size may also be taken into consideration as in a case of a linear model.

The obtained predicted value of the information regarding the position of each object to be tracked (including the size) is output to the associated area search unit 201. That is, instead of the position of the object in the previous frame, the predicted position of the object in the current frame calculated by the prediction unit 430 is input to the associated area search unit 201. The associated area search unit 201 sets a search range in accordance with the predicted position, and searches for an associated area. This operation is similar to that of the associated area search unit 201 in the example embodiments described above. However, the obtained information regarding the position of the object to be tracked is also output to the motion model update unit 432.

The motion model update unit 432 updates the motion model information. The method for this update depends on the motion model to be used.

In the case of the linear model, the motion model update unit 432 obtains a motion vector by getting a difference between the position obtained in the current frame and the position in the previous frame. Alternatively, the motion model update unit 432 may hold a history of positions of the object to be tracked in past several frames, obtain a motion vector therebetween, and use a representative value thereof (e.g., (weighted) average, median, or mode) as the motion vector. The same applies to the rate of change in size.

On the other hand, in the case of the Kalman filter, the motion model update unit 432 updates the state variable of the Kalman filter in accordance with the observation equation, and updates the accompanying parameter value of the Kalman filter. In the case of the particle filter, the associated area search unit 201 outputs, to the motion model update unit 432, not only the obtained position but also information regarding all the particles. The motion model update unit 432 performs particle filter update processing by using the position and the information regarding all the particles output from the associated area search unit 201. That is, the motion model update unit 432 calculates the overall likelihood and resamples the particles on the basis of the likelihood, and generates updated particle information as information regarding an updated motion model.

The updated motion model is stored in the motion model storage unit 431, and is used for predicting the position of the object to be tracked from the next time.

The new generation/deletion unit 408 further generates a motion model as an initial motion model for a new object, and stores the motion model in the motion model storage unit 431 in a similar manner to other objects to be tracked. The generated motion models vary depending on the type of the motion model to be used. The motion models are generated, initialized by an initialization method corresponding to each model, and then stored in the motion model storage unit 431. On the other hand, for an object to be tracked that is to be deleted, the new generation/deletion unit 408 also deletes information regarding the corresponding tracking ID stored in the motion model storage unit 431. Other operations are similar to those of the new generation/deletion unit 208 of the object tracking means 103 in the example embodiments described above.

Operations of components other than the prediction unit 430, the motion model storage unit 431, the motion model update unit 432, and the new generation/deletion unit 408 are similar to those of the object tracking means 103 in the example embodiments described above, and the latest tracking result information that has been obtained is output.

As described above, the object tracking means according to the present example embodiment performs tracking while predicting the position of the object to be tracked. As a result, the accuracy of tracking is improved, and even in a case of a large motion, the associated area search unit can narrow down the search range on the basis of the predicted position, and the processing time can be reduced.

Fourth Example Embodiment

Next, a fourth example embodiment of the present invention will be described in detail with reference to the drawings.

Figure 7:
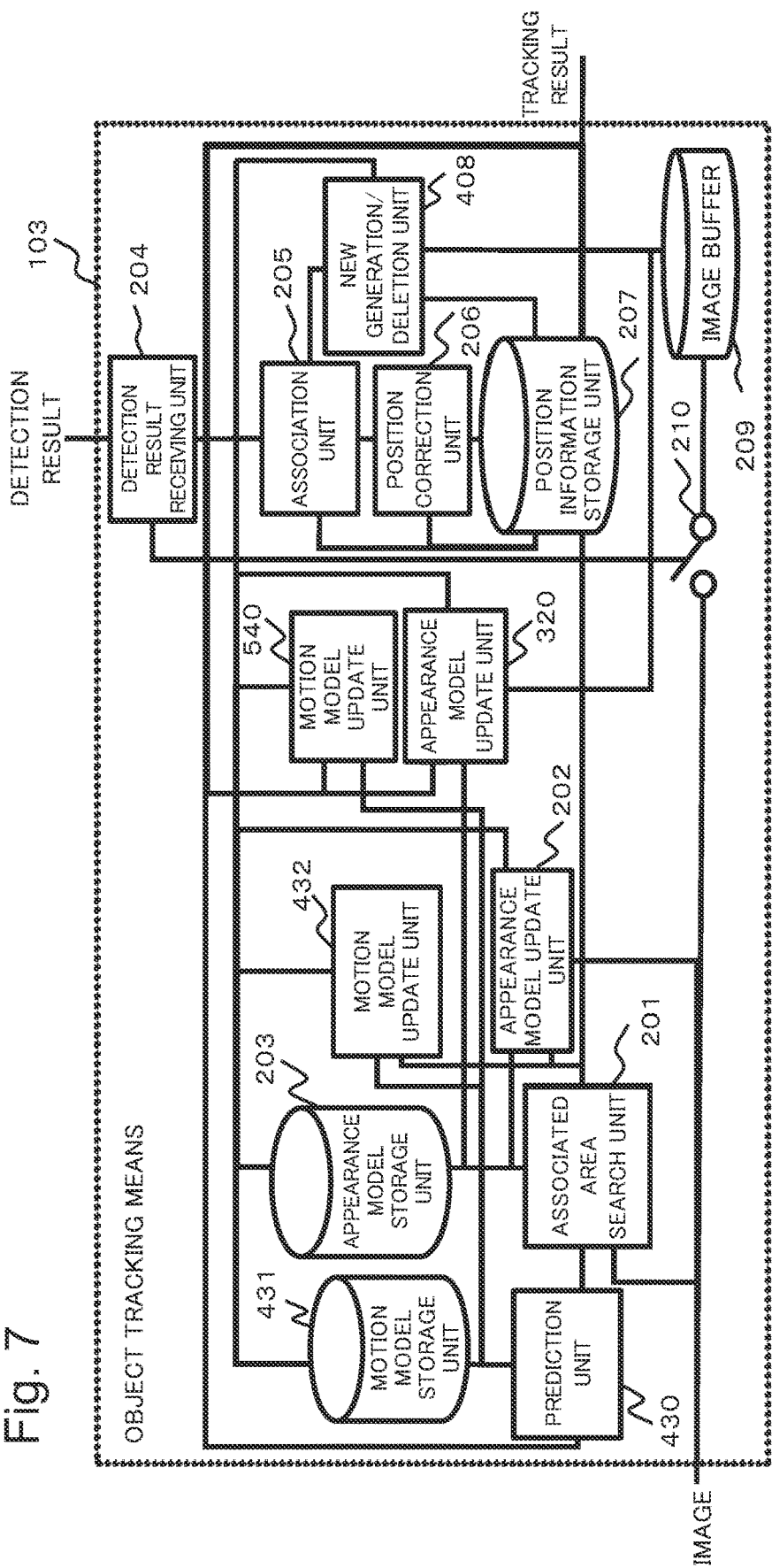
FIG. 7 is a diagram illustrating a configuration of object tracking means according to a fourth example embodiment.

FIG. 7 illustrates a configuration of object tracking means 103 according to the present example embodiment. The object tracking means 103 according to the present example embodiment includes an associated area search unit 201, an appearance model update unit 202, an appearance model storage unit 203, a detection result receiving unit 204, an association unit 205, a position correction unit 206, a position information storage unit 207, a new generation/deletion unit 408, an image buffer 209, a switch unit 210, an appearance model update unit 320, a prediction unit 430, a motion model storage unit 431, a motion model update unit 432, and a motion model update unit 540.

The object tracking means 103 according to the present example embodiment is different from the object tracking means 103 according to the third example embodiment in that the object tracking means 103 according to the present example embodiment includes the appearance model update unit 320 and the motion model update unit 540.

The processing operation of the appearance model update unit 320 is similar to that in the second example embodiment. Specifically, the appearance model update unit 320 updates an appearance model of a tracked object stored in the appearance model storage unit 203 on the basis of information regarding the position of the tracked object stored in the position information storage unit 207 and image information stored in the image buffer 209. The appearance model update unit 320 stores the updated appearance model information in the appearance model storage unit 203.

The motion model update unit 540 updates motion model information of the tracked object on the basis of the motion model information of the tracked object stored in the motion model storage unit 431 and position information in an object tracking result output from the position information storage unit 207. The motion model update unit 540 stores the updated motion model information in the motion model storage unit 431.

Next, an operation of the object tracking means 103 according to the present example embodiment will be described.

Operations of portions other than the newly added motion model update unit 540 are similar to those in the example embodiments described above, and thus description thereof is omitted. Thus, a processing operation of the newly added motion model update unit 540 will be described below.

The motion model update unit 540 updates a motion model on the basis of a result of association between a detected object and an object to be tracked. That is, the motion model update unit 540 obtains again the motion model on the basis of the motion model information before update stored in the motion model storage unit 431 and corrected information regarding the position of the object to be tracked output from the position information storage unit 207. The motion model update unit 540 stores the motion model information that has been obtained again in the motion model storage unit 431.

At this time, characteristics of the motion model obtained on the basis of the information regarding the position of the detected object is different from characteristics of the motion model obtained by tracking processing in some cases. Thus, motion models may be individually provided, and the motion models may be integrated and used for prediction. The position of the object obtained by detection is temporally older than the information regarding the position of the object obtained by tracking. Thus, the time difference makes it difficult to accurately predict the position in the current frame. On the other hand, the position information obtained by tracking, which can be predicted from position information up until immediately before the time of the current frame, can be predicted more accurately, but the prediction becomes less accurate in a case of a situation called a drift in which the position is shifted in tracking process. Thus, the accuracy of the position itself is often higher in the detection result. In consideration of this, for example, in a case where the difference between the position obtained by tracking and the position obtained by detection is small, the position in the immediately preceding tracking may be used as it is for the prediction. In a case where the difference between the position obtained by tracking and the position obtained by detection is large, the position in the current frame may be directly predicted from the position of the detected object, not from the position obtained by the immediately preceding tracking. In this manner, a variable for determining which motion model is to be used may be stored as a parameter of the motion model and used by the prediction unit 430. Alternatively, instead of using either one, both may be weighted and used in accordance with the confidence. In this case, the weighting parameter is stored as a parameter of the motion model and used by the prediction unit 430.

As described above, the object detection/tracking device according to the present example embodiment reflects a result of association between detection and tracking in a motion model. As a result, the accuracy of tracking can be improved.

Fifth Example Embodiment

Next, a fifth example embodiment of the present invention will be described in detail with reference to the drawings.

Figure 8:
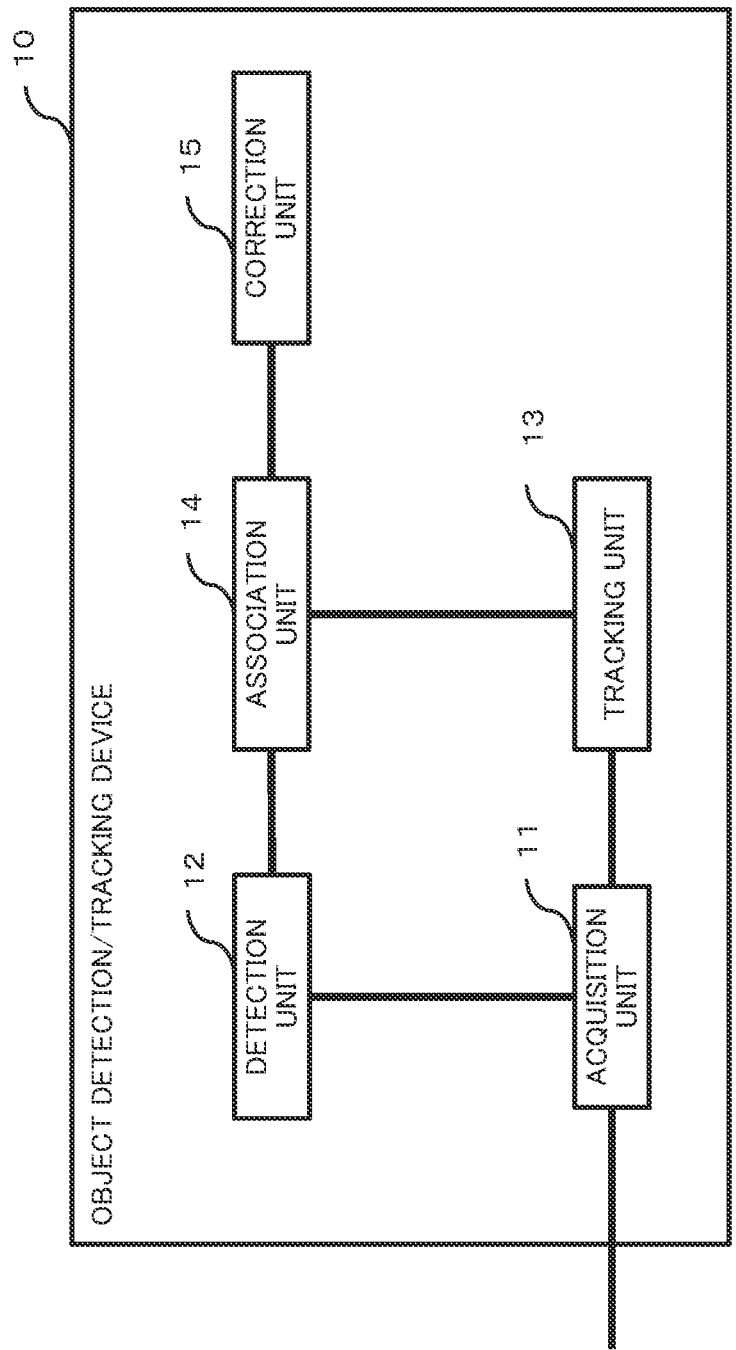
FIG. 8 is a diagram illustrating a configuration of an object detection/tracking device according to a fifth example embodiment.

FIG. 8 is a diagram illustrating a configuration of an object detection/tracking device according to the present example embodiment. Hereinafter, an outline of the object detection/tracking device will be described with reference to FIG. 8.

An object detection/tracking device 10 according to the present example embodiment includes an acquisition unit 11, a detection unit 12, a tracking unit 13, an association unit 14, and a correction unit 15.

The acquisition unit 11 acquires an image. The acquisition unit 11 outputs the acquired image to the detection unit 12 and the tracking unit 13.

The detection unit 12 detects an object in the image input from the acquisition unit 11. Specifically, the detection unit 12 specifies an area of the object in the input image and a position of the object in the image (hereinafter referred to as a "detection position"). The detection unit 12 outputs a detection result including the detection position and time information (or information for identifying the frame such as a frame number).

Processing of detecting an object from an image by the detection unit 12 may take time, and this tendency is particularly noticeable in a deep learning-based detection method. Thus, the tracking unit 13 performs processing on the acquired image in parallel with the detection unit 12.

The tracking unit 13 tracks an object in the acquired image. Specifically, the tracking unit 13 specifies the position of the same object as the tracked object in an image acquired earlier than the acquired image (hereinafter referred to as "tracking position information"). The tracking unit 13 outputs a tracking result including a tracking position of each specified object, a tracking ID for identifying the object, and time information of the acquired image (or information for identifying the frame such as a frame number).

When the processing in the detection unit 12 ends, the association unit 14 associates the detected object with the tracked object at the same time on the basis of the detection result and the tracking result.

The correction unit 15 corrects the position of the tracked object by using the position of the detected object.

Figure 9:
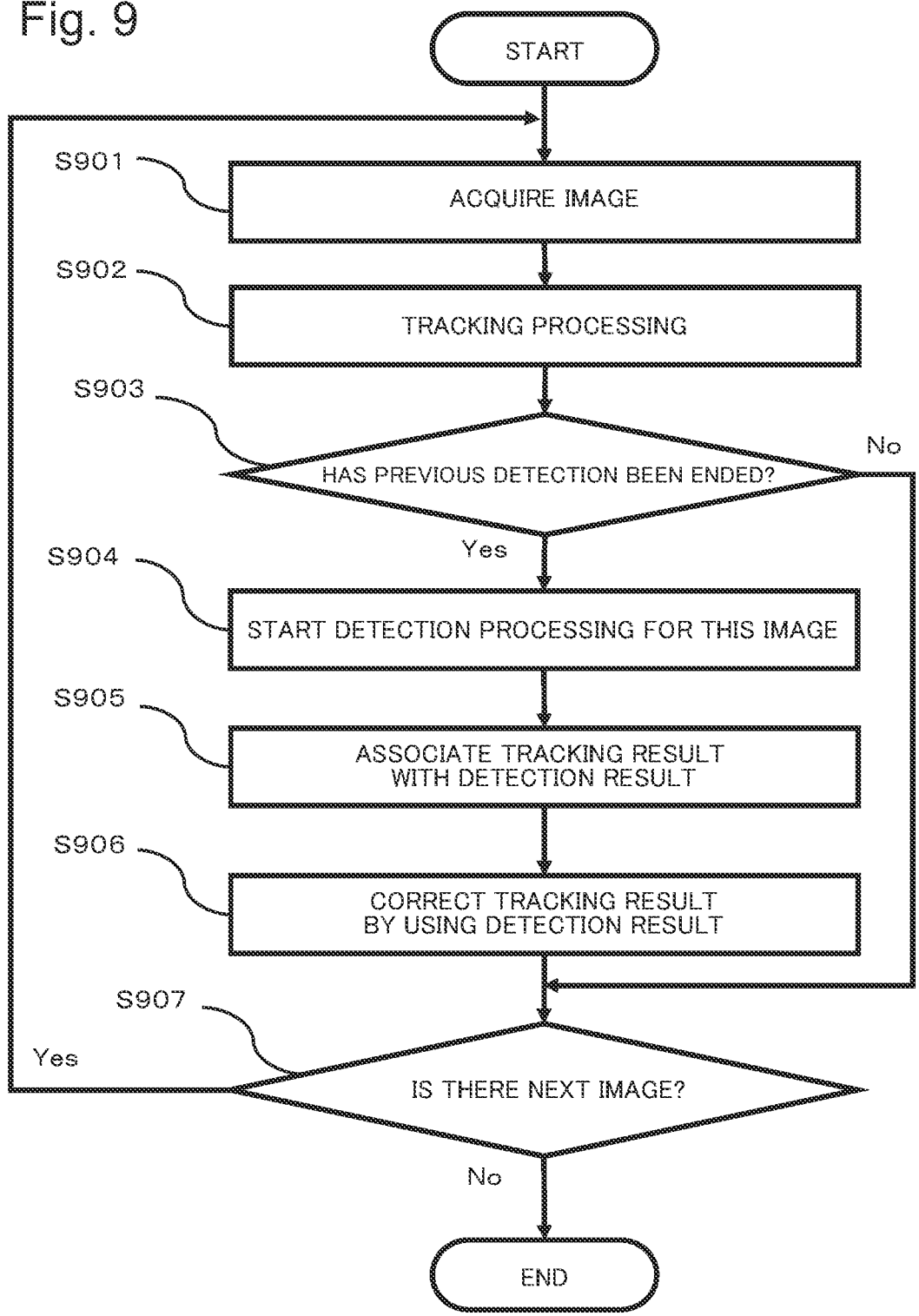
FIG. 9 is a flowchart illustrating a processing operation of the object detection/tracking device according to the fifth example embodiment.

FIG. 9 is a flowchart illustrating a flow of processing from acquisition of an image by the object detection/tracking device 10 to correction of position information according to the present example embodiment. Hereinafter, the flow of the processing by the object detection/tracking device will be described with reference to FIG. 9.

The acquisition unit 11 acquires an image (S901), and the tracking unit 13 tracks an object in the acquired image (S902). If the detection unit 12 has ended detection of an object in an image performed on the previous image (Yes in S903), the detection unit 12 outputs the detection result to the association unit 14, and starts processing of detecting the object in the image acquired this time (S904). Then, the association unit 14 associates the detected object with the tracked object, the objects being the same object, in images at the same time (S905). The correction unit 15 corrects the position of the tracked object by using the position of the detected object (S906). On the other hand, if the detection unit 12 has not ended detection of the object (No in S903), the association and correction processing is skipped. Then, if there is a next image (Yes in S907), the processing returns to S901 and an image is acquired. If there is no next image (No in S907), the processing ends.

As described above, the object detection/tracking device according to the present example embodiment performs tracking processing in parallel with detection processing even in a case where the detection processing is delayed, and corrects a tracking result by using a detection result when the detection processing is completed. As a result, even in a case where the detection processing is delayed, accurate tracking can be achieved.

<Hardware Configuration>
<Configuration of Hardware for Achieving Each Unit in Example Embodiments>

In the example embodiments of the present invention described above, blocks indicating the components of each device are shown in functional units. However, the blocks indicating the components do not necessarily mean that each component is constituted by a separate module.

Processing by the components may be implemented, for example, by a computer system reading and executing a program that is stored in a computer-readable storage medium and causes the computer system to execute the processing. The "computer-readable storage medium" is, for example, a portable medium such as an optical disk, a magnetic disk, a magneto-optical disk, or a nonvolatile semiconductor memory, or a storage device such as a read only memory (ROM) or a hard disk built in a computer system. The "computer-readable storage medium" includes a medium that can temporarily hold a program like a volatile memory inside a computer system, and a medium that transmits a program like a communication line such as a network or a telephone line. The program described above may be a program for implementing some of the functions described above, or a program that can implement the functions described above in combination with a program already stored in the computer system.

Figure 10:
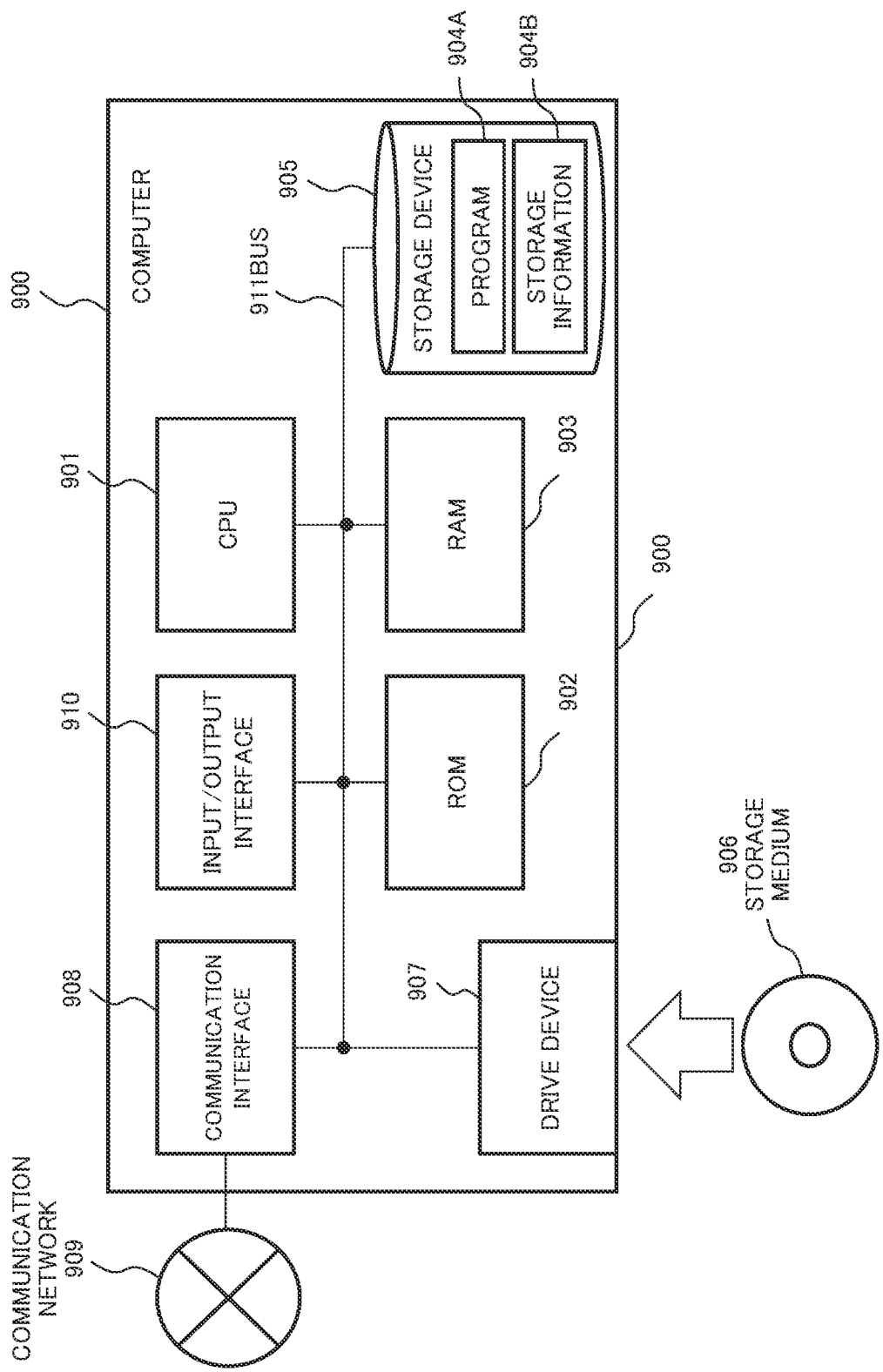
FIG. 10 is a block diagram illustrating an example of hardware constituting each unit in the example embodiments of the present invention.

The "computer system" is a system including a computer 900 as illustrated in FIG. 10 as an example. The computer 900 includes the following components.

One or a plurality of central processing units (CPUs) 901
ROM 902
Random access memory (RAM) 903
Program 904A and storage information 904B loaded to RAM 903
Storage device 905 for storing program 904A and storage information 904B
Drive device 907 that performs reading from and writing to storage medium 906
Communication interface 908 for connection with communication network 909
Input/output interface 910 for inputting/outputting data
Bus 911 that connects components For example, the components of the devices according to the example embodiments are achieved by the CPU 901 loading, into the RAM 903, the program 904A for implementing the functions of the components and then executing the program. The program 904A for implementing the functions of the components of each device is stored in advance in, for example, the storage device 905 or the ROM 902. Then, the CPU 901 reads the program 904A as necessary. The storage device 905 is, for example, a hard disk. The program 904A may be supplied to the CPU 901 via the communication network 909, or may be stored in advance in the storage medium 906, read by the drive device 907, and supplied to the CPU 901. The storage medium 906 is a portable medium such as an optical disk, a magnetic disk, a magneto-optical disk, or a nonvolatile semiconductor memory.

As to how each device is implemented, various modifications are available. For example, each device may be constituted by a possible combination of a separate computer 900 and a program for each component. A plurality of components included in each device may be constituted by a possible combination of one computer 900 and a program.

Some or all of the components of each device may be constituted by another general-purpose or dedicated circuit, a computer, or the like, or by a combination thereof. These may be constituted by a single chip, or may be constituted by a plurality of chips connected via a bus.

In a case where some or all of the components of each device are implemented by a plurality of computers, circuits, or the like, the plurality of computers, circuits, or the like may be arranged in a centralized manner, or may be arranged in a distributed manner. For example, the computers, circuits, or the like may be in a form in which they are connected via a communication network, such as a client and server system, a cloud computing system, or the like.

The forms of the above-described example embodiments may be combined, or some of the components may be swapped. The form of the invention is not limited to the above-described example embodiments, and various changes may be made without departing from the gist of the present invention.

The whole or part of the example embodiments disclosed above can be described as, but not limited to, the following supplementary notes.

(Supplementary Note 1)
An object detection/tracking device comprising:
acquisition means for acquiring a video;
tracking means for tracking an object in the video;
detection means for detecting an object in the video;
association means for associating the detected object with the tracked object, the objects being same object, in images at same time among images in the video; and
correction means for correcting, for the associated objects, a position of the tracked object by using a position of the detected object.

(Supplementary Note 2)
The object detection/tracking device according to Supplementary Note 1, in which
the correction means corrects, for the associated objects, the position of the object in at least one of images acquired after a time of the detection.

(Supplementary Note 3)
The object detection/tracking device according to Supplementary Note 2, further comprising:
new generation means for generating an appearance model representing an appearance visual feature of the tracked object for each of the tracked objects,
in which the tracking means searches for an area similar to the appearance model in an image in the video acquired by the acquisition means, and
the new generation means performs new object addition processing in which an object, among the detected objects, that has not been associated with the tracked object in the association is newly added to objects to be tracked.

(Supplementary Note 4)
The object detection/tracking device according to Supplementary Note 3, further comprising:
appearance model update means for updating the appearance model, for an object that has been associated in the association, based on a position where the object has been detected and an image at the time of the detection, in which the tracking means searches for an area similar to the updated appearance model in the image in the video in the tracking.

(Supplementary Note 5)

The object detection/tracking device according to Supplementary Note 3 or 4, further comprising:

prediction means for predicting the position of the tracked object in an image in a newly acquired video based on a motion model related to a motion of an object and a history of the position of the tracked object, in which the new generation means generates a motion model for each of the tracked objects, and the tracking means searches for a search area determined based on the predicted position in the image in the video in the tracking.

(Supplementary Note 6)

The object detection/tracking device according to Supplementary Note 5, in which the new generation means generates an initial motion model in the new object addition processing, and the tracking means uses the generated initial motion model in subsequent tracking processing.

(Supplementary Note 7)

The object detection/tracking device according to Supplementary Note 5 or 6, further comprising:

motion model update means for updating, for an object to be tracked that has been associated by the association means, the motion model of the object to be tracked based on the corrected position.

(Supplementary Note 8)

The object detection/tracking device according to Supplementary Note 7, in which the new generation means generates a motion model for each of the detected object and the tracked object, and the prediction means calculates a predicted position of the object in an image in a newly acquired video by using each of the generated motion models.

(Supplementary Note 9)

The object detection/tracking device according to Supplementary Note 8, in which the prediction means calculates a predicted position of the object in an image in a newly acquired video based on the position of the tracked object, in a case where a difference between the position of the tracked object and the position of the detected object in an image at a time earlier than the image is equal to or less than a threshold, and calculates a predicted position of the object in the image in the newly acquired video based on the position of the detected object, in a case where the difference is larger than the threshold.

(Supplementary Note 10)

An object detection/tracking method comprising:
acquiring a video;
tracking an object in the video;
detecting an object in the video;
associating the detected object with the tracked object, the objects being same object, in same image among images in the video; and
correcting, for the associated objects, a position of the tracked object by using a position of the detected object.

(Supplementary Note 11)

A program recording medium that records a program for causing a computer to execute:

processing of acquiring a video;
processing of tracking an object in the video;
processing of detecting an object in the video;
processing of associating the detected object with the tracked object, the objects being same object, in same image among images in the video; and
processing of correcting, for the associated objects, a position of the tracked object by using a position of the detected object.

INDUSTRIAL APPLICABILITY

Using the object detection/tracking device of the present invention enables object tracking in which, even in a case where detection processing takes time, a delay is reduced. Thus, it can be used not only for video monitor but also for tracking of an object in an application in which a real-time nature is required, such as real-time detection/tracking of a lesion site using an endoscope camera.

REFERENCE SIGNS LIST 100 object detection/tracking device
101 video acquisition means
102 object detection means
103 object tracking means
104 switch control means
105 switch means
106 switch means
201 associated area search unit
202 appearance model update unit
203 appearance model storage unit
204 detection result receiving unit
205 association unit
206 position correction unit
207 position information storage unit
208 new generation/deletion unit
209 image buffer
210 switch unit
320 appearance model update unit
408 new generation/deletion unit
430 prediction unit
431 motion model storage unit
432 motion model update unit
540 motion model update unit
10 object detection/tracking device
11 acquisition unit
12 detection unit
13 tracking unit
14 association unit
15 correction unit

What is claimed is:

1. An object detection/tracking device comprising one or more memories storing instructions and one or more processors configured to execute the instructions to:

acquire a video;
track a plurality of first objects in the video;
detect a plurality of second objects in the video;
in each of a plurality of images of the video in which a tracking time of one of the first objects has been tracked is the same as a detection time when one of the second objects has been detected, associate the one of the second objects with the one of the first objects;
in at least one of the plurality of images acquired after the detection time of the one of the second objects that has been associated with one of the first objects, correct a position of the one of the first objects by using the position of the one of the second objects in the plurality of images in which the one of the second objects was detected at the detection time;
generate an appearance model representing an appearance visual feature of each of the first objects;
search for an area similar to the appearance model in the plurality of images of the acquired video;
perform new object addition processing in which one of the second objects that has not been associated with one of the first objects is added as a new one of the first objects and is to be tracked;
calculate a predicted position of the one of the second objects in an image of a newly acquired video based on the position of the one of the first objects, in response to a difference between the position of the one of the first objects and the position of the one of the second objects associated with the one of the second objects in a preceding image being equal to or less than a threshold; and
calculate the predicted position of the one of the second objects in the image of the newly acquired video based on the position of the one of the second objects, in response to the difference being larger than the threshold.

2. The object detection/tracking device according to claim 1,
wherein the one or more processors are configured to execute the instructions to further:
update the appearance model based on the position of the one of the second objects aid the plurality of images in which the one of the second objects in which the one of the second objects was detected at the detection time; and
search for an area similar to the updated appearance model in the plurality of images.

3. The object detection/tracking device according to claim 1,
generate a motion model for each first object;
wherein the one or more processors are configured to execute the instructions to further:
predict the position of the one of the first objects in the image of the newly acquired video based on the motion model related to a motion of the one of the first objects aid a history of the position of the one of the first objects; and
search for a search area in the image of the newly acquired video based on the predicted position.

4. The object detection/tracking device according to claim 3, wherein the one or more processors are configured to execute the instructions to further generate an initial motion model; and
use the generated initial motion model in tracking processing of the newly acquired video.

5. The object detection/tracking device according to claim 3, wherein the one or more processors are configured to execute the instructions to further:
update, for the one of the first objects that has been associated with the one of the second objects, the motion model of the one of the first objects based on the position thereof that has been corrected.

6. The object detection/tracking device according to claim 5, wherein the one or more processors are configured to execute the instructions to further:
generate a motion model for each second object, and
predict the position of the one of the second objects in the image of the newly acquired video based on the motion model for the one of the second objects and the motion mod el for the one of the first objects with which the one of the first objects is associated.

7. An object detection/tracking method comprising:
acquiring, by a processor, a video;
tracking, by the processor, a plurality of first objects in the video;
detecting, by the processor, a plurality of second objects in the video;
in each of a plurality of images of the video in which a tracking time of one of the first objects has been tracked is the same as a detection time when one of the second objects has been detected, associating, by the processor, the one of the second objects with the one of the first objects;
in at least one of the plurality of images acquired after the detection time of the one of the second objects that has been associated with one of the first objects, correcting, by the processor, a position of the one of the first objects by using the position of the one of the second objects in the plurality of images in which the one of the second objects was detected at the detection time;
generating, by the processor, an appearance model representing an appearance visual feature of each of the first objects;
searching, by the processor, for an area similar to the appearance model in the plurality of images of the acquired video;
performing, by the processor, new object addition processing in which one of the second objects that has not been associated with one of the first objects is added as a new one of the first objects and is to be tracked;
calculating, by the processor, a predicted position of the one of the second objects in an image of a newly acquired video based on the position of the one of the first objects, in response to a difference between the position of the one of the first objects and the position of the one of the second objects associated with the one of the second objects in a preceding image being equal to or less than a threshold; and
calculating, by the processor, the predicted position of the one of the second objects in the image of the newly acquired video based on the position of the one of the second objects, in response to the difference being larger than the threshold.

8. A non-transitory program recording medium that is recorded with a program that when executed by a computer causes a computer to perform:
acquiring a video;
tracking a plurality of first objects in the video;
detecting a plurality of second objects in the video;
in each of a plurality of images of the video in which a tracking time of one of the first objects has been tracked is the same as a detection time when one of the second objects has been detected, associating the one of the second objects with the one of the first objects;
in at least one of the plurality of images acquired after the detection time of the one of the second objects that has been associated with one of the first objects, correcting a position of the one of the first objects by using the position of the one of the second objects in the plurality of images in which the one of the second objects was detected at the detection time;
generating an appearance model representing an appearance visual feature of each of the first objects;
searching for an area similar to the appearance model in the plurality of images of the acquired video;

performing new object addition processing in which one of the second objects that has not been associated with one of the first objects is added as a new one of the first objects and is to be tracked;

calculating a predicted position of the one of the second objects in an image of a newly acquired video based on the position of the one of the first objects, in response to a difference between the position of the one of the first objects and the position of the one of the second objects associated with the one of the second objects in a preceding image being equal to or less than a threshold; and calculating the predicted position of the one of the second objects in the image of the newly acquired video based on the position of the one of the second objects, in response to the difference being larger than the threshold.

* * * * *